United States Patent [19]

Grinberg et al.

[11] Patent Number: 4,688,897

[45] Date of Patent: Aug. 25, 1987

[54] LIQUID CRYSTAL DEVICE

[75] Inventors: Jan Grinberg, Los Angeles; Michael J. Little, Tarzana, both of Calif.

[73] Assignee: Hughes Aircraft Company, Los Angeles, Calif.

[21] Appl. No.: 745,471

[22] Filed: Jun. 17, 1985

[51] Int. Cl.⁴ .................................................. G02F 1/03
[52] U.S. Cl. ..................................................... 350/336
[58] Field of Search ........................ 350/336, 337, 338

[56] References Cited

U.S. PATENT DOCUMENTS

| 3,731,986 | 5/1973 | Fergason | 350/337 X |
| 4,228,574 | 10/1980 | Culley et al. | 350/337 X |
| 4,256,787 | 3/1981 | Shaver et al. | 350/337 X |
| 4,537,471 | 8/1985 | Grinberg et al. | 350/333 |

OTHER PUBLICATIONS

Tove Larsen, "A Survey of the Theory of Wire Grids", IRE Transactions on Microwave Theory and Techniques, 1962, pp. 191-201.

Primary Examiner—L. T. Hix
Assistant Examiner—Brian W. Brown
Attorney, Agent, or Firm—V. D. Duraiswamy; V. G. Laslo; A. W. Karambelas

[57] ABSTRACT

A liquid crystal device (22) is disclosed which employs a wire grid (24) as a polarizer, a mirror and an electric field electrode. A twisted nematic liquid crystal display device is described which employs the wire grid (24) in place of the rear electrode (15), polarizer (19) and mirror (20) to provide a display which is less complicated and has better contrast and resolution than that of prior art displays.

15 Claims, 4 Drawing Figures

LIQUID CRYSTAL DEVICE

BACKGROUND OF THE INVENTION

This invention relates to electro-optic devices and, more particularly, to liquid crystal displays.

Many liquid crystal displays have been devised since the properties of liquid crystal materials were found to be useful in display technologies. One of the more popular types of liquid crystal displays utilizes the properties of nematic-phase liquid crystal materials to form a twisted nematic display operating in the reflective mode. A cell is constructed in which the nematic material is sandwiched between front and rear transparent substrates which have received one or more forms of surface treatment and which are oriented in a particular relationship to one another so as to produce an optical media which in its relaxed state rotates the plane of polarization of light passing through it by ninety degrees. Such an arrangement generally utilizes a first absorbing type polarizer which restricts the light entering and leaving the front of the cell to that having a particular plane of polarization. A second absorbing polarizer having its plane of transmission rotated ninety degrees with respect to the first polarizer is positioned behind the liquid crystal cell, and a mirror is positioned behind the second polarizer.

The light passing through the first polarizer and the front substrate has its polarization plane twisted by the liquid crystal material so that the light exiting the cell passes through the second polarizer, is reflected by the mirror, and travels back through the same path to appear as a bright area on the display.

The two substrates are each provided with transparent electrodes. A voltage placed across these electrodes provides an electric field which causes the liquid crystal molecules to rotate, and thus untwist. Under this condition, light passing through the first polarizer and into the liquid crystal material does not pass through the second polarizer, since its polarization plane is no longer twisted into alignment with this polarizer. Instead, the light is absorbed by the second polarizer, creating a dark area on the display. By appropriate shaping and actuating of the electrodes, various alphanumeric and other images may be shown on the display. Display devices of the type described above are used in watches and, more recently, in flat panel displays used with computers, especially portable computers.

Conventional liquid crystal devices exhibit relatively low contrast between activated and nonactivated portions when the ambient light level is low; reading such a display becomes difficult. An additional problem associated with liquid crystal displays is due to the fact that the polarizers are placed outside the liquid crystal cell, and, hence, are separated from the liquid crystal material by the thickness of the substrates. This separation contributes to substantial parallax which tends to restrict the viewing angle and reduce the resolution of the display.

Accordingly, it is a purpose of the present invention to provide a new and improve liquid crystal device.

It is another purpose of the present invention to reduce the complexity of liquid crystal displays.

It is yet another purpose of the present invention to improve the contrast and resolution of nematic-phase liquid crystal displays.

SUMMARY OF THE INVENTION

The foregoing and other objects of the present invention are realized in a liquid crystal display in which a wire grid polarizer replaces the second transparent electrode, the second polarizer, and the mirror of a conventional liquid crystal display. The grid is formed by closely spaced parallel electrical conductors. By connecting the thin conductors of the grid together, the grid may be made to act as an electrode. By properly spacing the grid conductors, the grid may be made to act as a polarizer which, rather than absorbing cross-polarized light, transmits that light. Light polarized parallel to the grid conductors is reflected. By reflecting light of one polarization while transmitting light of another polarization, the electrode acts as both a polarizer and a mirror, substantially increasing the contrast over previous devices using a separate polarizer and mirror.

By eliminating the separating polarizer and mirror, the complexity of the display is reduced substantially. Since the wire grid polarizer is in intimate contact with the liquid crystal material, parallax is also reduced substantially, which acts to increase the resolution of the display.

Other objects and advantages of the invention will become apparent by reference to the specification taken in conjunction with the drawings in which like reference numerals refer to like elements in the various views.

DESCRIPTION OF THE PREFERRED EMBODIMENTS

Figure 1:
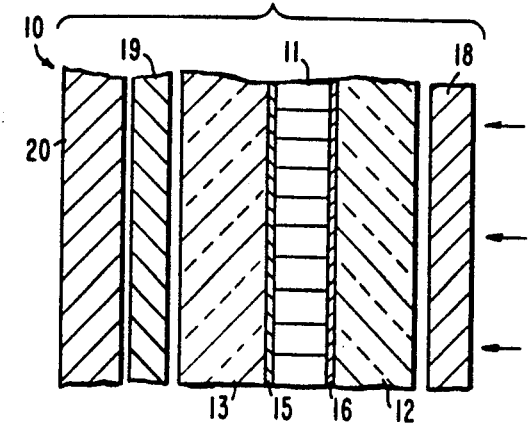
FIG. 1 is a cross sectional view of a conventional twisted nematic-phase liquid crystal display of the prior art.

In order to illustrate the features of the invention, it will be described with respect to an improved reflective-type twisted nematic liquid crystal display. However, as will become apparent from a reading of the specification, the invention is by no means limited to use with such a display. FIG. 1 illustrates in cross section a conventional reflective-type liquid crystal display 10 of the twisted nematic-phase variety. The display includes a liquid crystal material 11 positioned between a first glass plate 12 and a second glass plate 13. Each of these plates has one or more transparent electrodes deposited on its surface adjacent the liquid crystal material 11. For example, an electrode 15 is deposited on the surface of the glass plate 13 and an electrode 16 is deposited on the surface of the glass plate 12. A first polarizer 18 is positioned between a source of incident light and the glass plate 12 and forms the front of the display 10. A second polarizer 19 is positioned behind the second glass plate 13, and a mirror 20 is positioned behind the second polarizer 19.

Figure 2:
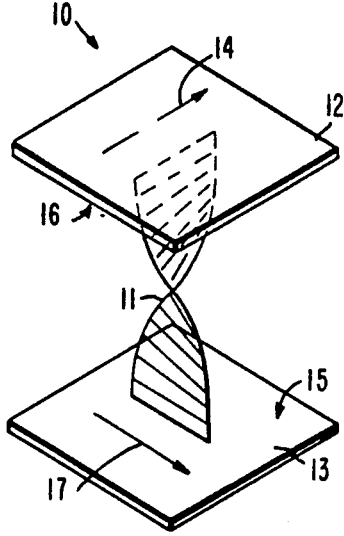
FIG. 2 is a perspective view of a portion of a conventional twisted nematic-phase liquid crystal display of the prior art.

In constructing a twisted nematic liquid crystal display, a liquid crystal material with a positive dielectric anisotropy and a high impedance is generally used. By suitably treating the surfaces of the glass plates 12 and 13, the molecules of the liquid crystal material adjacent the glass surfaces are caused to align parallel to the surfaces of the plates and in a preferred direction. Referring to FIG. 2, the plates 12 and 13 are oriented with respect to each other so that the preferred molecular alignment direction of these plates, denoted by arrows 14 and 17 respectively, are orthogonal. This orientation causes the twisted effect in the liquid crystal material, as illustrated by the twisted plane 11 in FIG. 2. The twisted configuration induces a ninety degree twist in the polarization of the light passing through the liquid crystal material in its relaxed state. Such an effect is described in U.S. Pat. No. 3,731,986, entitled Display Devices Using Liquid Crystal Light Modulation, issued to James L. Fergason, on May 8, 1973.

First polarizer 18 is oriented with respect to plate 12 so that polarized light emerging from the polarizer 18 will pass through the liquid crystal molecules. Similarly, second polarizer 19 is oriented with its transmission plane at ninety degrees to that of polarizer 18, whereby light proceeding through and having its polarization plane rotated ninety degrees by the twisted molecules will pass through the second polarizer 19.

The operation of the device 10 with the liquid crystal molecules in their relaxed (twisted) state is as follows. Light entering from the right in FIG. 1 passes through the polarizer 18. The polarized light emerging therefrom passes through the plate 12 and the transparent electrode 16, and has its plane of polarization rotated ninety degrees by the liquid crystal molecules. After passing through the transparent electrode 15 and the plate 13, the light passes through the polarizer 19, is reflected by the mirror 20, passes again through the polarizer 19, is twisted by the liquid crystal material 11, and passes through the polarizer 18 to appear to the viewer as a bright area on the display.

When a voltage is applied between the electrodes 15 and 16, an electric field is established which causes those liquid crystal molecules subjected to the field to rotate toward alignment with the field. The molecular rotation causes the molecules to untwist, thus eliminating the twist in the polarization of the light passing through the liquid crystal material in the area between the energized electrodes. Consequently, the polarization of the light passing through the first polarizer 18 is not twisted and hence the light is not able to pass through the second polarizer 19 and is absorbed thereby. This absorption appears as a dark area on the display 10 in the location between the electrodes 15 and 16. By shaping one or both of the electrodes 15 or 16, the display may be used to produce alphanumerics and other images.

One problem associated with the conventional liquid crystal display 10 shown in FIG. 1 is the limited resolution which is obtainable. The resolution of such displays is limited, in part, due to the fact that the polarizers 18 and 19 and the mirror 20 are separated from the liquid crystal material 11 by the thickness of the plates 12 and 13. This separation causes a substantial amount of parallax, which greatly affects off-normal viewing resolution.

Another problem associated with conventional liquid crystal displays is the low contrast obtainable between light and dark areas at low ambient light levels. For example, the liquid crystal display often receives light at an angle, where the amount which is transmitted by the polarizers compared to that absorbed is quite low. This results in a lowering of the contrast of the display.

Figure 3:
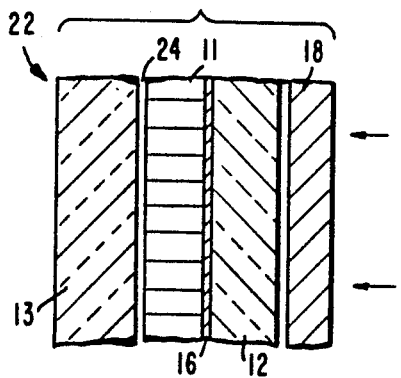
FIG. 3 is a cross sectional view of the improved twisted nematic-phase liquid crystal display of the present invention.

A liquid crystal display 22 constructed in accordance with the teachings of the present invention is shown in FIG. 3. In the display 22, in contrast to the prior art, the polarizer 19 and the mirror 20 of the display 10 are omitted; and a metal grid 24 is provided in place of the electrode 15 on the surface of the glass plate 13 which lies adjacent the liquid crystal material 11. As described below, the grid 24 acts as an electrode, a polarizer and a mirror in the present invention.

For the display 22, as in the prior art display 10 described above, the liquid crystal material 11 lies in a twisted configuration between the planar glass plates 12 and 13 and the transparent electrode 16 is provided on the surface of the plate 12 adjacent the liquid crystal material 11. However, it is readily apparent to those skilled in the art that electrode 16 could reside on the other surface of substrate 12 if it has a low enough electrical impedance.

Figure 4:
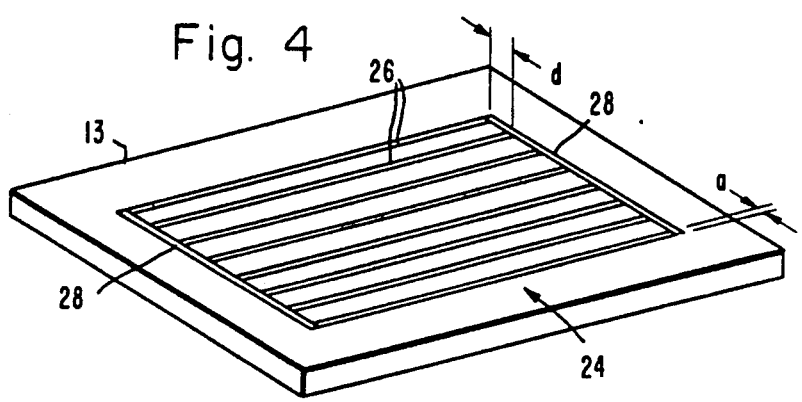
FIG. 4 is a perspective view illustrating a wire grid polarizer which may be utilized with the present invention.

FIG. 4 illustrates a typical configuration of a grid 24 of individual conductors 26 placed upon one surface of the plate 13. The ends of each of the conductors 26 are joined together by conductive material 28 so that all points on the grid 24 can be placed at the same potential and act as the rear electrode 24 for the display 22.

Wire grids have been used for many years for polarizing various electromagnetic waves. An article in the 1962 IRE Transactions on Microwave Theory and Techniques entitled "*A Survey of the Theory of Wire Grids*," by Tove Larsen, pp. 191-201, reviews many instances of such use. A grid of suitably spaced fine metallic conductors reflects an electromagnetic wave when the wave is polarized in the direction of the conductors. A wave polarized perpendicular to the conductors of the grid passes through the grid with little transmission loss. The effectiveness of the grid as a polarizer depends on the width and spacing of the conductors in relation to the wavelength of the incident radiation, as described below.

The present invention utilizes a grid comprising closely spaced parallel lines of conductive material (hereinafter referred to as a wire grid even though the conductive lines may not actually be wires) in the display 22 to replace the conventional second polarizer 19 used in the prior art display 10. The transmission plane of the grid 24 (the plane at which light polarized parallel thereto is transmitted through the grid) may be oriented parallel to the tranmission plane of the first polarizer 18, so that light having its polarization twisted by the relaxed twisted liquid crystal molecules does not pass through the grid 24 but is instead reflected by it. The reflected light travels back through the display and appears to the viewer as a bright area.

Upon application of an electric field, the untwisted molecules permit light to pass through the display without rotation of the polarization plane. This light passes through the grid 24 and, since no mirror is present, the light is not reflected back to the viewer, who will thus perceive a dark image in the area subjected to the electric field. It will be seen that the operation of the display 22 is substantially identical to the operation of the display 10, with, however, several distinct advantages, as discussed below. It should be noted that the transmission plane of the grid 24 can be oriented at ninety degrees to the transmission plane of the first polarizer 18.

In such instance, the displayed image will be reversed. That is, the display will be normally dark, with images appearing as bright areas.

To create an electric field in the display 22, a voltage is applied between the transparent electrode 16 and the wire grid 24. The conductive lines 26, connected together by the end connectors 28 thus act in place of the rear elecrode 15 used in the prior art display 10.

The polarizer 18 and 19 employed in the prior art display 10 either absorb or transmit light, depending upon the polarization of that light. In contrast, the grid 24 either reflects or transmits light as a function of its polarization. Further, it will be appreciated that the reflection from grid 24 takes place directly at the interface between the liquid crystal material 11 and the inner surface of the plate 13. This is unlike the prior art display 10 where light travels through the plate 13, and the polarizer 19 before it is reflected.

The reflective characteristic of the grid 24 and its close proximity to the active electro-optic material 11 combine both to enhance the contrast of the display and to substantially reduce parallax. This reduction in parallax greatly improves the resolution of the display under off-normal viewing conditions.

It will also be appreciated that by eliminating the need for the rear polarizer 19 and the mirror 20, displays constructed using the teachings of the present invention can be smaller and less costly than prior art displays.

In constructing the display 22, the dimensions of the grid 24 must be chosen to provide suitable transmission and reflection characteristics at the wavelength of the incident light. One measure of the effectiveness of a wire grid in this application is referred to as the extinction ratio of the grid. The transmission extinction ratio of a grid is the ratio of the amount of light transmitted through the grid from a light source polarized perpendicular to the grid lines to the amount of light transmitted through the grid when that same light source is polarized parallel to the grid lines.

The reflection extinction ratio is defined in a similar fashion.

It is desirable to provide a grid having high extinction ratios, preferably on the order of 1,000 or more. It has been found that in order to achieve high extinction ratios, the grating period of the grid should be one-tenth (or less) of the wavelength of the incident radiation. Further, the coverage of the grid surface by the grid lines should be in the range of 40 to 80 percent. The grating period for the grid is the sum of the width of a grid line (shown as the dimension a in FIG. 4) and the width of the space between adjacent lines. This sum is shown as the dimension d in FIG. 4. The coverage of the grid surface by the grid lines is expressed by the ratio a/d.

For incident light in the visible spectrum, it is desirable to provide the grid 24 having a grating period on the order of 0.05 microns, while for incident light in the infrared spectrum, a grating period on the order of 0.3 microns is adequate.

In the fabrication of grids 24, laser holography has been used to expose photoresist grating patterns which are sputter etched into gold metal films on the surface of transparent substrates. Using this technique, grids have been fabricated with a grating period of 0.28 microns and a 60 to 70 percent coverage of the grid surface by the grid lines.

The extinction ratios of the above fabricated grids were measured using both infrared and visible light. With infrared incident radiation at a wavelength of 3.39 microns, the transmission extinction ratio of the grid was on the order of six thousand. With visible incident radiation at a wavelength of 0.633 microns, reflection and transmission extinction ratios on the order of 30 and 45, respectively, were measured. Tests conducted with off-normal incident radiation at angles up to forty-five degrees indicated that extinction ratios did not degrade significantly from those measured with incident radiation normal to the plane of the grid. It is anticipated that grids having grating periods substantially smaller than those described above will be fabricated in the near future.

Because of the extremely close spacings between adjacent grid lines in the grid 24, it is further anticipated that such grid lines could be used to create a high resolution dot matrix display for use in video display applications. For example, instead of connecting together all of the grid lines 26, each grid line might be fabricated as a "dotted line" comprising individual conductive segments separated from each other.

By providing a transparent conductor to each segment or to groups of segments it would be possible to construct a high resolution array of segments, or pixels, each individually addressable by suitable driver circuits.

Yet another advantage provided by the use of the grid 24 in place of the rear polarizer 19 and mirror 20 of the prior art is that it enables the use of back illumination without degrading the contrast of the display. Back illumination is desirable in situations where ambient front illumination is inadequate for viewing the display.

In prior art designs, back illumination was accomplished by using a partially silvered mirror for the mirror 20 and placing a light source behind it. However, the partially silvered mirror reduces the contrast of the display when used with either front or rear illumination. In contrast, the display 22 of the present invention may be backlit simply by providing a source of light behind the rear plate 13. Accordingly, contrast remains high in this configuration regardless of whether front or rear illumination is provided.

While the invention is disclosed and particular embodiments thereof are described in detail, it is not intended that the invention be limited solely to these embodiments. Many modifications will occur to those skilled in the art which are within the spirit and scope of the invention. For example, while the invention has been described in terms of a twisted-nematic display, the invention is also applicable for use with other liquid crystal devices such as light valves, as well as for liquid crystal devices employing other than twisted-nematic material configurations. It is thus intended that the invention be limited in scope only by the appended claims.

What is claimed is:

1. A liquid crystal device for controlling certain characteristics of light from a light source incident thereon comprising:
   first and second transparent substrates;
   a liquid crystal material sandwiched between the substrates;
   a transparent electrode supported by the first substrate;
   a grid including parallel electrical conductors supported by the second substrate adjacent the liquid crystal material, where the spacing between adjacent conductors in said grid is sufficiently small in relation to the wavelength of the incident light that the grid acts as a polarizer which transmits through it a substantial portion of light polarized along a first plane, and reflects from it a substantial portion of light polarized along a second plane; and second light polarizer positioned between the first substrate and the light source.

2. The device of claim 1 further including connection means for making electrical connections to one or more of the grid conductors, whereby these conductors act as a second electrode.

3. The device of claim 2 in which the connection means includes an end conductor connecting together the ends of the parallel electrical conductors on each and of the grid.

4. The device of claim 1 in which the sum of the width of a grid conductor and the space between adjacent conductors is less than the wavelength of the incident light.

5. The device of claim 4 in which the ratio of the width of a grid conductor to the space between adjacent conductors is at least 0.4.

6. The device of claim 1 in which the second polarizer is oriented with respect to the grid so that light passing through the second polarizer is polarized along the first plane.

7. The device of claim 1 in which the second polarizer is oriented with respect to the grid so that light passing through the second polarizer is polarized along the second plane.

8. The device of claim 6 wherein:

said first plane is orthogonal to the second plane;

connection means are provided for making electrical connections to one or more of the grid conductors, whereby the conductors act as a second electrode;

said liquid crystal material is nematic-phase material arranged in a ninety degree twisted molecular configuration between the substrates whereby light passing through the second polarizer also passes through the liquid crystal material and has its plane of polarization twisted thereby; and field means are provided for establishing an electric field across the liquid crystal material by applying a voltage across the first and second electrodes, the field acting to untwist those crystal molecules subjected to the field.

9. The device of claim 7 wherein:

said first plane is orthogonal to the second plane;

connection means are provided for making electrical connections to one or more of the grid conductors, whereby the conductors act as a second electrode;

said liquid crystal material is nematic-phase material arranged in a ninety degree twisted molecular configuration between the substrates whereby light passing through the second polarizer also passes through the liquid crystal material and has its plane of polarization twisted thereby; and field means are provided for establishing an electric field across the liquid crystal material by applying a voltage across the first and second electrodes, the field acting to untwist those crystal molecules subjected to the field.

10. A high-contrast, low-parallax liquid crytal display device for responding to incident light from a light source, said device comprising:

first and second transparent substrates;

a liquid crystal material sandwiched between the substrates;

a transparent electrode supported on said first substrate;

an absorbing-type polarizer positioned adjacent to said first substrate and between the light source and said first substrate;

a grid including parallel electrical conductors supported by said second substrate and in contact with said liquid crystal material, where the spacing between adjacent conductors in said grid is sufficiently small in relation to the wavelength of the incident light so that the grid acts as a polarizer which transmits through it a substantial portion of light polarized along a first plane, and as a mirror which reflects a substantial portion of light polarized along a second plane; and connection means for making electrical connections to one or more of the grid conductors whereby these conductors are a second electrode.

11. The device of claim 10 in which the connection means includes an end conductor connecting together the ends of the parallel electrical conductors on each end of the grid.

12. The device of claim 10 wherein said grid and said absorbing-type polarizer are oriented with respect to each other such that the respective transmission planes of said grid and said absorbing-type polarizers are parallel.

13. The device of claim 10 wherein said grid and said absorbing-type polarizer are oriented with respect to each other such that the transmission plane of said grid is oriented at ninety degrees to the transmission plane of said absorbing-type polarizer.

14. The device of claim 10 wherein liquid crystal material is twisted nematic liquid crystal.

15. A high-contrast liquid crystal display device operated with back-illumination provided by a light source and responding to incident light from said source, said device comprising:

first and second transparent substrates;

a liquid crystal material sandwiched between the substrates;

a transparent electrode supported on said first substrate;

a grid including parallel electrical conductors supported by the second substrate adjacent the liquid crystal material, where the spacing between adjacent conductors in said grid is sufficiently small in relation to the wavelength of the incident light that the grid acts as a polarizer which transmits through it a substantial portion of light polarized along a first plane, and as a mirror which reflects from it a substantial portion of light polarized along a second plane; and said light source positioned behind said second substrate such that said second substrate is between said light source and said grid.

* * * * *